(12) United States Patent
Sander

(10) Patent No.: US 7,593,156 B2
(45) Date of Patent: Sep. 22, 2009

(54) MICROSCOPE WITH MICRO-MIRRORS FOR OPTIONAL DEFLECTION AND/OR BEAM SPLITTING

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 12/247,519

(22) Filed: Oct. 8, 2008

(65) Prior Publication Data
US 2009/0059170 A1  Mar. 5, 2009

Related U.S. Application Data

(63) Continuation-in-part of application No. 11/466,466, filed on Aug. 23, 2006, now abandoned.

(30) Foreign Application Priority Data

Aug. 26, 2005  (DE) .................. 10 2005 040 471

(51) Int. Cl.
   *A61B 3/13* (2006.01)
   *G02B 21/22* (2006.01)
(52) U.S. Cl. ................... 359/376; 351/216
(58) Field of Classification Search ............ 359/368, 359/372–377, 381; 351/216
   See application file for complete search history.

(56) References Cited

U.S. PATENT DOCUMENTS

| | | | |
|---|---|---|---|
| 4,856,872 A | 8/1989 | Spitznas et al. | |
| 5,321,447 A | 6/1994 | Sander et al. | |
| 5,587,832 A | 12/1996 | Krause | |
| 6,069,733 A | 5/2000 | Spink et al. | |
| 6,128,077 A | 10/2000 | Jovin et al. | |
| 6,399,935 B1 | 6/2002 | Jovin et al. | |
| 6,483,641 B1 | 11/2002 | MacCaulay | |
| 6,525,878 B1 | 2/2003 | Takahashi | |
| 6,898,004 B2 | 5/2005 | Shimizu et al. | |
| 7,215,882 B2 * | 5/2007 | Cho et al. ................ | 396/89 |
| 2002/0036824 A1 | 3/2002 | Sasaki | |
| 2004/0047034 A1 * | 3/2004 | Sander ................... | 359/385 |
| 2004/0160654 A1 | 8/2004 | Pfefferseder et al. | |
| 2004/0174593 A1 | 9/2004 | Weyh et al. | |
| 2004/0196550 A1 | 10/2004 | Shimizu et al. | |
| 2005/0012994 A1 | 1/2005 | Sander | |
| 2007/0121201 A1 * | 5/2007 | Sander ................... | 359/377 |
| 2007/0285770 A1 * | 12/2007 | Sander ................... | 359/385 |

FOREIGN PATENT DOCUMENTS

| | | |
|---|---|---|
| DE | 19960583 A1 | 7/2001 |
| DE | 10352040 A1 | 7/2005 |

OTHER PUBLICATIONS

Oculus Optikgerate GMBH, "SDI II BIOM II For Vitreo-Retinal Surgery", Sep. 1998, Wetzlar, Germany.

* cited by examiner

Primary Examiner—Alessandro Amari
Assistant Examiner—Mark Consilvio
(74) Attorney, Agent, or Firm—Hodgson Russ LLP

(57) ABSTRACT

The present invention concerns a microscope with at least one optical element (21*a*, 21*b*) for optional deflection and/or splitting of a beam path passing through the microscope, wherein the at least one optical element (21*a*, 21*b*) is fashioned as a micro-mirror array (80) having a number of individually controllable and adjustable micro-mirrors (82).

7 Claims, 8 Drawing Sheets

MICROSCOPE WITH MICRO-MIRRORS FOR OPTIONAL DEFLECTION AND/OR BEAM SPLITTING

CROSS REFERENCE TO RELATED APPLICATIONS

This application is a continuation-in-part of U.S. patent application Ser. No. 11/466,466 filed Aug. 23, 2006, which claims priority of German patent application no. 10 2005 040 471.5 filed Aug. 26, 2005, both of which are incorporated by reference herein.

FIELD OF THE INVENTION

The present invention concerns microscopes of a type having at least one optical element for optional deflection and/or splitting of a beam path passing through the microscope.

BACKGROUND OF THE INVENTION

In microscopy many applications call for microscopes with a small and compact design. Thus, it is known that an initially vertical beam path from an object to be observed is deflected within the microscope body into the horizontal direction, in order to be able to arrange optical components, such as zoom systems, in a horizontal manner. Such a horizontal beam path can then be further deflected into the vertical, and if necessary again into a horizontal, direction. It is also possible to create diagonally running beam paths within the microscope body.

Such a deflection of beam paths is conventionally brought about by deflection elements which are designed either as prisms or prism systems or mirrors or mirror systems. Such systems for their part have a certain spatial extension, making the design of small and compact microscopes difficult. These problems arise in particular with stereo microscopes.

Ophthalmological microscopes are in themselves known. They have a main objective, a magnification system downstream of this and a binocular system with oculars. In order to provide a stereo microscope, in a magnification system which is, for example, designed as a zoom system a splitting of the beam path passing through the main objective into a number of beam paths can be performed. Further, ophthalmological microscopes are known which allow simultaneous observation of the object by a first user (main operator) and by a second user (assistant).

For intra-ocular surgery, for example in order to be able to microscopically observe the fundus or the vitreous areas near the fundus of a human eye, additional optics are needed on stereo microscopes. These comprise lenses which are placed upstream of the main objective (on the object side).

In the leaflet "SDI II, BIOM II" from Oculus Optikgeräte GmbH from 1998 and U.S. Pat. No. 4,856,872 such an additional optic is described. This additional optic has a lens arranged close to the object to be observed (ophthalmoscopy lens) and a lens arranged in the vicinity of the main objective (reduction lens).

From DE 41 14 646 C2 a solution is known in which an ophthalmology attachment for an operation microscope is accommodated in an attachment housing which can be positioned laterally in relation to the main objective. The attachment has an ophthalmoscopy lens, an optical system for erecting the image and a displaceable lens (correction lens) for focusing.

The image erecting system is needed because the additional optics reproduce the microscope image with lateral and vertical inversion and thus pseudo-stereoscopically in the observation. This means, amongst other things, that when considering the depth in the intermediate image generated by the ophthalmoscopy lens the front and back are inverted. In order to work in microsurgery, however, an erected, stereoscopically correct image is necessary. At the same time as the image erecting, therefore, in the operation microscope an exchange of the two observation beam paths (pupil exchange) must take place in order, during the stereoscopic observation, to avoid the pseudo-stereo effect that would otherwise occur. A particularly preferred embodiment of such an optical system for image erecting is known as the SDI (or, Stereoscopic Diagonal Inverter) system. Such a system is, for example, known from the previously mentioned "SDI II, BIOM II" leaflet from 1998. The use of such SDI systems, however, is associated with considerable disadvantages for the microscope system or the image quality of the microscope. In particular, the adaptation of the optical beam path from this additional system to that of a stereo microscope proves to be very involved. The result is frequently defective image quality and clipping of the field which is caused by inadequate mechanical adaptation of the SDI system to the microscope. Furthermore, the construction height of such SDI systems is detrimental to the ergonomic construction height of the microscope.

From DE 103 32 603 A1 in order to improve the above-mentioned disadvantages the fashioning of an optical inverter system is known for erecting and for observation beam inversion of a pseudo-stereoscopic image with a deflection element with a focusing power or refractive power. This allows, in a simple manner, the construction height of the stereo microscope to be reduced compared with the customary solutions, since customary SDI systems can be dispensed with. Thus, the ergonomic construction height of the microscope can also be reduced in an advantageous manner.

SUMMARY OF THE INVENTION

The present invention seeks to provide a microscope that is compact in design and flexible in use.

This aim is achieved by a microscope with at least one optical element for optional deflection and/or splitting of the main beam path, wherein the at least one optical element is a micro-mirror array having a plurality of individually controllable and adjustable micro-mirrors.

With the fashioning according to the invention of at least one optical element as a micro-mirror array it is possible in a simple manner, to switch between various functions or modes of the microscope. If, for example, the inverter function is needed, by corresponding electronic control and adjustment of the micro-mirrors of the micro-mirror array a concave mirror arrangement is set. If the inverter function is not needed, by corresponding electronic control and adjustment of the micro-mirrors a planar arrangement can be set. A particular advantage here is that no mechanical components need to be moved, as was the case, for example, in the conventional situation when concave mirrors were swung out of the optical beam paths and corresponding plane mirrors swung in. The micro-mirror arrays now being proposed can replace conventional concave and plane mirrors so that electromagnetic guides can also be dispensed with. No disturbing vibrations occur, which in the adjustment or exchange of the conventional concave or plane mirrors could only be avoided with a relatively great mechanical effort.

Unlike conventional solutions, the solution according to the invention is mechanically uncomplicated, since no relatively large mechanical components such as concave mirrors and plane mirrors have to be swung with great accuracy.

A microscope fashioned according to the invention can also be built in a particularly space-saving manner, since for the conversion from a concave mirror arrangement to a plane mirror arrangement, or vice versa, no guides, motors and gears are needed.

Other microscope functions can also be provided in a simple manner with the solution according to the invention. By a suitable arrangement of the individual micro-mirrors (geometric) beam splitters, for example, can be easily created. For example, it is possible to easily arrange neighbouring micro-mirrors with their mirror surface at an angle to each other so that a light beam falling onto these is allowed through in part but is also partly deflected.

By a suitable arrangement of micro-mirrors it is further possible in a simple manner to reflect light or data inwards or outwards. Such inward or outward reflections can be created in directions which are not possible in such a space-saving manner with conventional mirror or prism arrangements.

Advantageously, the microscope according to the invention has two optical elements fashioned as micro-mirror arrays. In this way it is, for example, possible (when setting a concave mirror arrangement for both micro-mirror arrays), to deflect an in particular horizontally running parallel beam path which occurs on the first deflection element initially in the vertical direction, and then, through a further deflection at the second deflection element, to create a beam path running essentially parallel to the original horizontal beam path. A vertically and laterally correct image is hereby created along the beam path running vertically between the two microscope planes. Advantageously, here both micro-mirror arrays have the same focusing refractive power. In this way, as mentioned, a parallel beam path is fashioned by the first mirror array in a laterally and vertically correct intermediate image, and by the second mirror array in turn as a parallel beam path.

As a result, optimum use can be made of this vertically running beam path. This allows the construction height of a microscope to be kept very small or optimum use to be made of the available construction height. Overall, the optical elements fashioned as micro-mirror arrays have a dual function, namely, first of all, the deflection, and secondly the focusing (with the generation of intermediate images) of the beam paths falling upon them.

Advantageously, the microscope according to the invention has a main objective defining a first optical axis and deflection elements for deflection of a beam path running parallel to the first optical axis along a second optical axis in a first microscope plane, which extends at an angle, in particular essentially vertically, to the first optical axis, and then along a third optical axis into a second microscope plane, which extends essentially parallel to the first microscope plane above this. A microscope with such a design is of much smaller construction than conventional solutions since a majority of the optical components that are necessary or advisable can be provided in the first and second microscope planes, which advantageously run horizontally.

According to a particularly preferred design of the microscope according to the invention it is fashioned as a stereo microscope. Stereo microscopes are used, inter alia, in retinal surgery or intra-ocular surgery, wherein, as mentioned previously in the introduction, additional optics are needed on the stereo microscopes. Such additional optics generate pseudo-stereoscopic images which must be corrected by means of an inverter device. By means of two micro-mirror arrays provided according to the invention, which are provided in a concave mirror arrangement, such an inverter system can be created in a particularly simple manner.

According to a further preferred design of the microscope or stereo microscope according to the invention this has a magnification system, in particular a zoom system, in the first or second microscope plane fashioned along the second or third optical axis and having at least two stereoscopic observation channels.

Such a zoom system can be optionally positioned in front of or behind the inverter system. Positioning behind the inverter system proves to be particularly beneficial, since in this case the precision requirements on the optical elements or deflection elements of the inverter system arranged for this purpose are relatively low. It is likewise conceivable for the magnification system to be fashioned along the vertically running beam path between the two microscope planes. By appropriate positioning of the magnification system overall the construction height or the horizontal construction length of the microscope can be influenced in a desired manner.

It is particularly advantageous if at least one optical element with a refractive power or focusing power (micro-mirror array) of the inverter system simultaneously serves as a deflection element for deflecting beam paths between the first to third optical axes. By means of such multiple functionality of the optical elements the construction volume can be kept low in an effective manner.

The stereo microscope according to the invention advantageously has a decoupling device for decoupling an assistant beam path from a main observer beam path. By means of such a decoupling device, which, for example, can be designed as a physical or geometrical beam splitter, main observer observation or assistant observation can be easily provided. Such a decoupling device can in particular be created as a micro-mirror array.

According to a further preferred embodiment of the stereo microscope according to the invention, the micro-mirror arrays and the additional optic positioned upstream of the main objective are coupled together in an electromechanical fashion. In this way it is possible, in a simple manner, when the additional optic is not used, to set the plane mirror arrangement of the micro-mirror arrays. Here, the coupling ensures that the respective arrangement of the mirror arrays and the use of the additional optic can be coordinated in a particularly simple manner.

BRIEF DESCRIPTION OF THE DRAWINGS

The invention is now described further using the attached drawing, which shows as follows.

DETAILED DESCRIPTION OF THE INVENTION

Figure 1A:
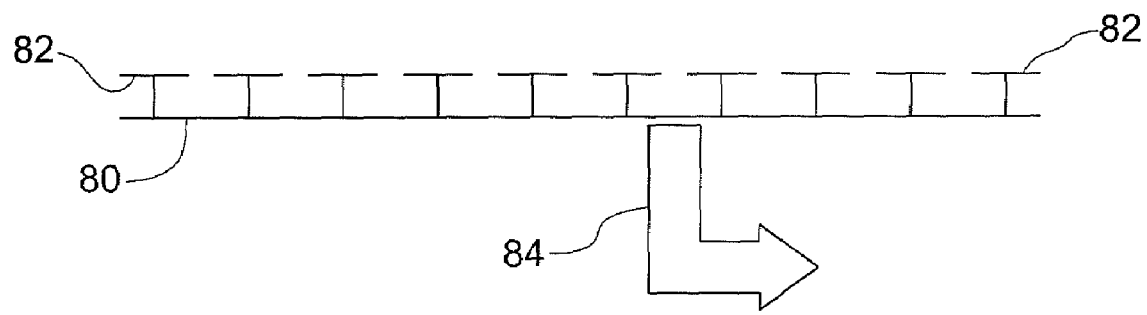
FIGS. 1A and 1B are enlarged schematic representations of a micro-mirror array which can be used according to the invention.
Figure 1B:
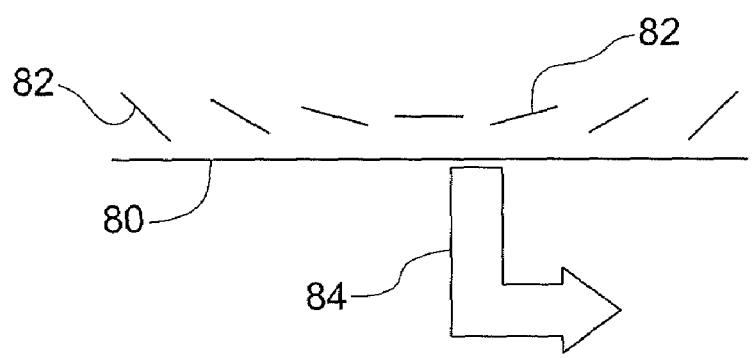

FIGS. 1A, 1B are a schematic representation of the operating principle of a micro-mirror array which can be used according to the invention. The micro-mirror array is denoted overall by 80 and the respective micro-mirrors by 82. A connection of the micro-mirror array 80 to an electronic supply or a control device (not shown) is represented schematically and denoted by 84.

In FIG. 1A the micro-mirrors 82 of the micro-mirror array 80 are set in such a way that overall a plane mirror arrangement of the micro-mirror array results, e.g. the reflective surfaces of the micro-mirrors 82 are arranged parallel to each other and in a planar fashion.

FIG. 1B shows the state in which the micro-mirrors 82 are connected or controlled in such a way that in all a concave mirror arrangement is generated. It can be seen that in order to create this concave mirror function the micro-mirrors 82 are, in fact, arranged correspondingly in one plane, but each micro-mirror is swung or tilted in relation to the neighbouring micro-mirror in a rotationally symmetrical manner.

The specific electronic control, programming and supply of this micro-mirror array 80 is not shown in FIGS. 1A, 1B. It should be mentioned that such control, programming and supply can be integrated in corresponding, in themselves known devices of a stereo microscope or a separate electronics unit.

Figure 2:
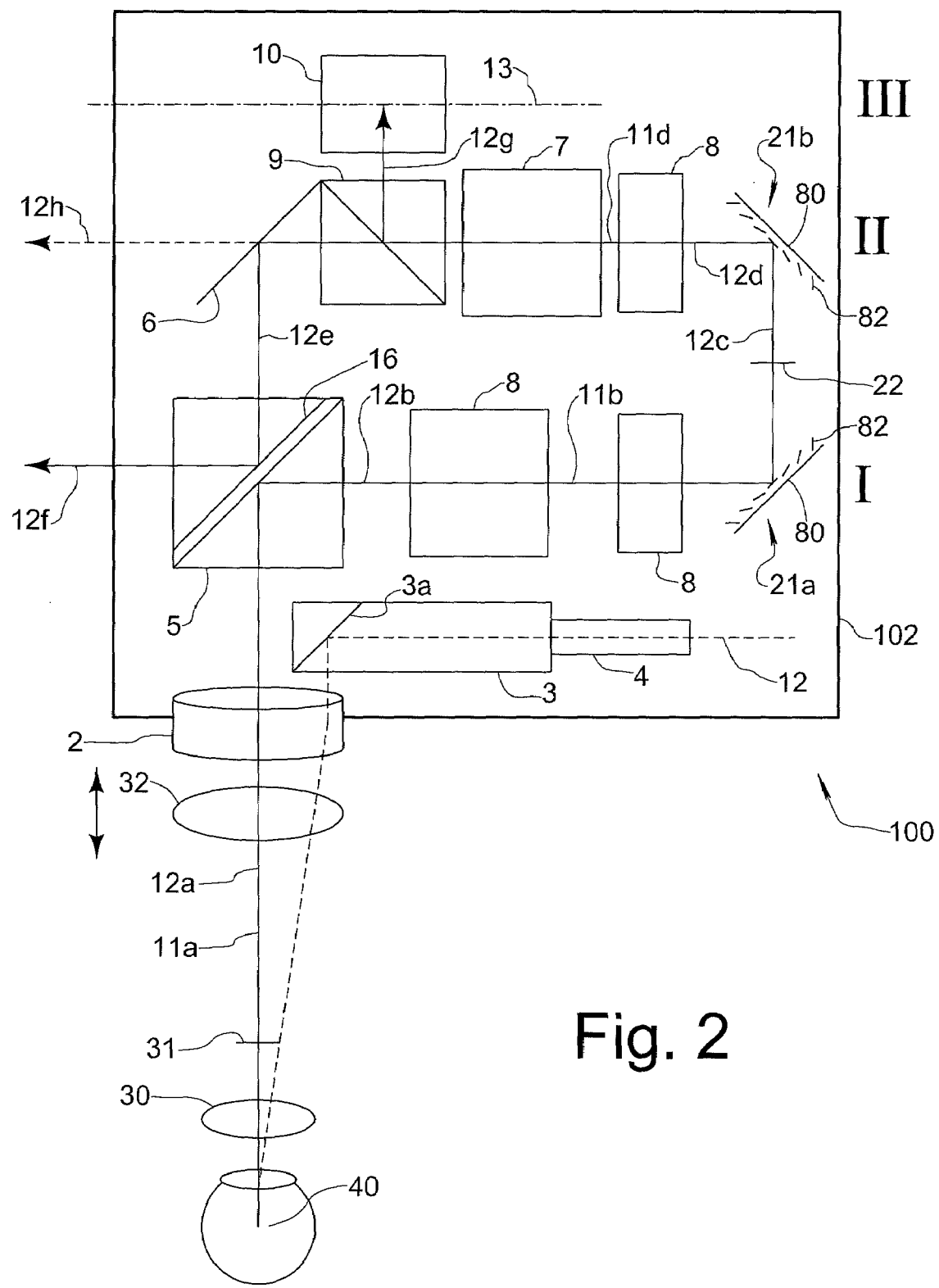
FIG. 2 is a schematic side view of a stereo microscope according to an embodiment of the invention with upstream ophthalmology attachment.

A preferred embodiment of a microscope according to the invention fashioned as a stereo microscope is referred to overall in FIG. 2 by 100. The stereo microscope has a microscope body 102, in which as optical components to begin with a main objective 2 and a magnification system 7, fashioned in particular as a zoom system 7, are provided.

The microscope also has optical elements or deflection elements 5, 21a, 21b. Element 5 is fashioned as a mirror or prism. The optical elements 21a, 21b are fashioned as micro-mirror arrays 80 comprising individually controllable micro-mirrors 82 (shown purely schematically). By means of these optical elements axes 12a to 12h of observation beams radiating from an object 40 to be observed, which to begin with run essentially (for 12a) in a vertical direction along the optical axis of the main objective 2, referred to in the following as the first optical axis 11a, can be deflected in two essentially horizontally running microscope planes I, II (for 12b, 12d). It can be seen that the magnification system 7 in the embodiment shown is arranged in the second microscope plane II. The optical axes in the first and second microscope planes are referred to as the second or third axes 11b, 11d.

On the object side, as far as the magnification system 7 is concerned, optionally in the first and/or second microscope planes I, II along the respective optical axes, optical additional components, here referred to together by 8, for example filter, laser shutter, optical splitter or elements for generation of intermediate images and/or deflections, are provided.

The microscope shown is designed for the simultaneous observation of the object 40 by a main operator and an assistant. To this end, in the second microscope plane II a deflection element or a decoupling device 9 is provided, which brings about the decoupling of the observation beam path 12g for the assistant from the observation beam path 12d for the main operator. The observation of the object 40 by the assistant takes place in a third microscope plane III. This decoupling device 9 can in particular also be fashioned as a micro-mirror array.

The stereoscopic splitting of the (uniform) beam path 12a that passes the main objective 2 can take place in a known fashion at any point within the microscope housing 102. Advantageously, the stereoscopic splitting takes place by means of the magnification system 7, which, for example, can have two or four stereoscopic observation channels. It is also conceivable for the magnification system 7 to be designed with four pairs of stereoscopic observation channels, wherein then a pair of stereoscopic observation channels in each case for the main operator or the assistant is provided for.

Figure 3A:
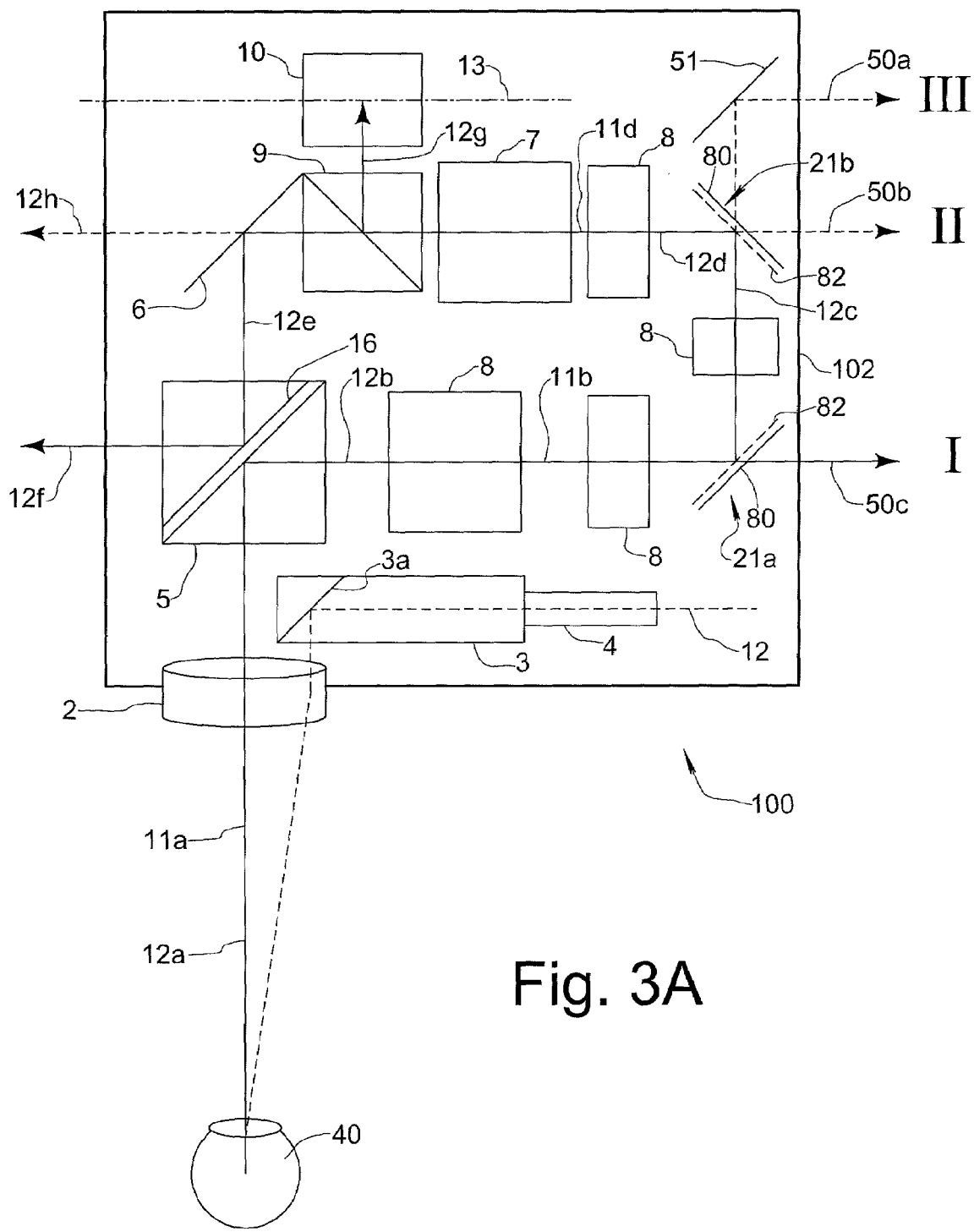
FIG. 3A is a view similar to that of FIG. 2, wherein the stereo microscope is shown without the ophthalmology attachment and correspondingly adapted optic.
Figure 3B:
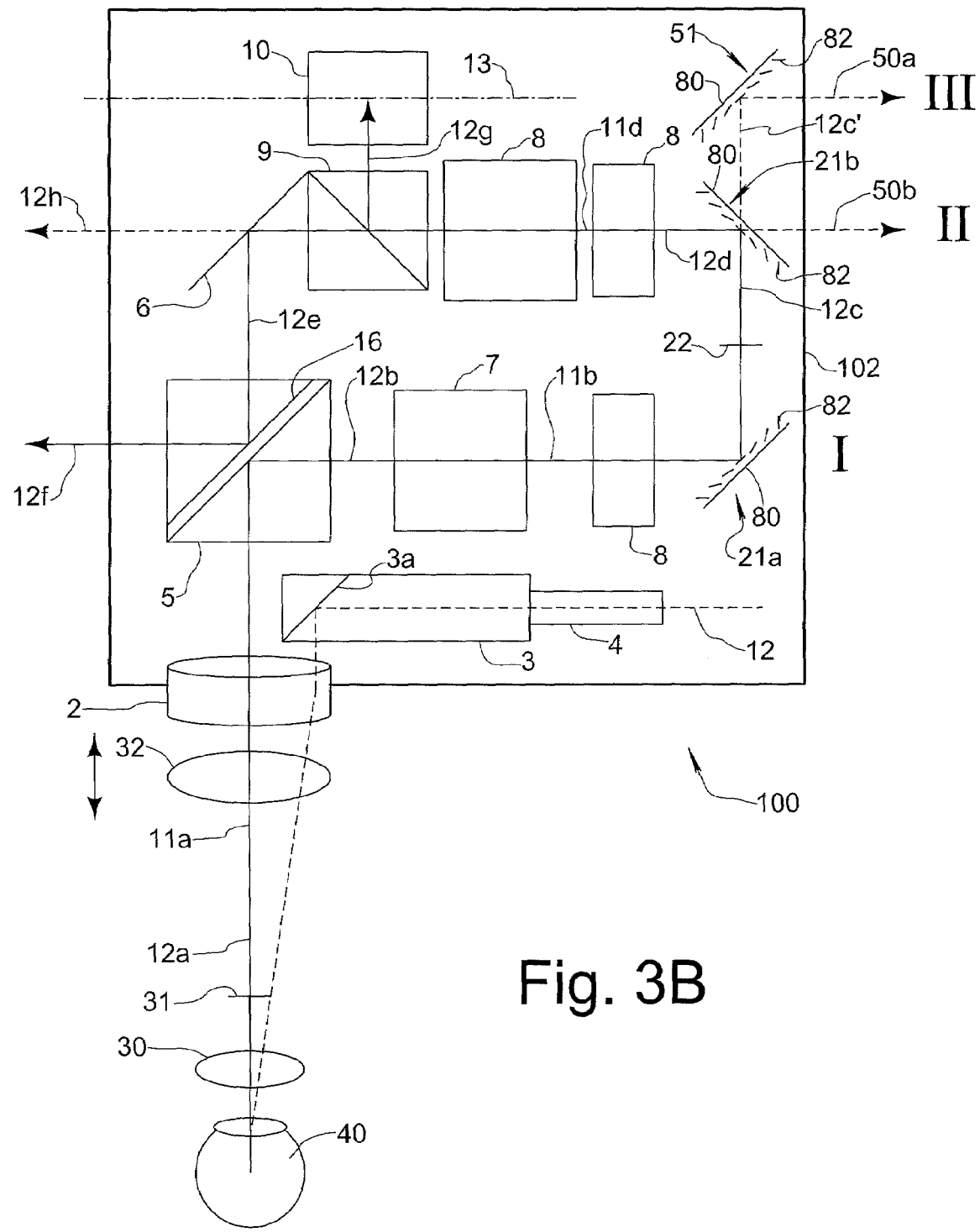
FIG. 3B is a schematic side view of a stereo microscope according to another embodiment of the invention with upstream ophthalmology attachment.

The provision of four magnification channels in the context of the magnification system allows the creation of a small vertical clearance between the respective observation axis and the object to be observed both for the main operator and the assistant. Advantageously, two magnification channels of the magnification system, in particular the magnification channels for the main operator, run horizontally at the same height, wherein two further magnification channels run parallel to these, i.e. likewise horizontally, with a vertical clearance from each other. These magnification channels with vertical clearance can in particular be used by assistants. Here, it is in particular possible for the magnification channels with vertical clearance to run above or below the midpoint of the connecting line between the magnification channels for the main operator fashioned at the same height. This provides a particularly dense packing of the four magnification channels, as a result of which a particularly small construction height of the stereo microscope according to the invention can be achieved. FIGS. 2, 3A, and 3B, for the purposes of clarity, show just one axis of the observation beam paths. In particular, the observation beam path in the second microscope plane II is referred to by 12d. By way of explanation it should be said that the two observation beam paths for the main operator lie one behind another in the direction of observation of FIGS. 2, 3A, and 3B so that only one of these observation beam paths can be shown. The observation beam paths with vertical clearance in the second microscope plane, which are diverted on the deflection element 9 into the third microscope plane III, are not shown in detail. The vertically running observation beam path 12g, with regard to the preferred embodiment of the magnification system 7, also simply represents a schematic simplification, since in fact in the embodiments shown in FIGS. 2, 3A, and 3B overall two observation beam paths running vertically next to each other are deflected into the third microscope plane. A full illustration of this preferred embodiment of a magnification system is disclosed in DE 102 55 960, corresponding to U.S. Pat. No. 7,206,127, which is incorporated herein by reference.

By means of binocular tubes (not shown) at the decoupling device 9 a stereoscopic observation of the object 40 by the main operator or the assistant is then possible.

Advantageously, for the further deflection of the stereoscopic observation beam paths for the main operator behind the decoupling device 9, a further deflection element 6 is provided, by means of which the (stereoscopic) observation beam paths (for 12e) for the main operator can be diverted from the second microscope plane II, for example, back into the first microscope plane I. In the first microscope plane I a further deflection element 16 is provided, by means of which the observation beam paths for the main operator are deflected back into essentially a horizontal direction again. The beam paths to a binocular tube (not shown) in the microscope plane I are referred to by 12f.

If, on the other hand, observation of the objective 40 by the main operator in the second microscope plane II is desired, the deflection element 6 can be dispensed with or this can be designed to be semi-permeable or displaceable. In this case, the observation beam paths referred to by 12h result for the main operator.

For the assistant in the third microscope plane III a further deflection element 10 is provided by means of which the (essentially vertically running) beam paths 12g decoupled by the decoupling device 9 can be deflected into the third microscope plane (i.e. essentially in a horizontal direction). The deflection element 10 can preferably be swung according to the orientation of the assistant observation beam paths around an axis 13 or an axis running vertically to this axis so that an assistant via the assistant's binocular tube (not shown) is able to see in the example shown into the identification plane or out of the identification plane.

A lighting system for the microscope shown is overall referred to by 3, 4, wherein 4 refers to a fibre cable for a lighting device 3. By means of a deflection element 3a light is applied from the fibre cable 4 at a desired angle on the object 40 to be lit. The optical axis of the fibre cable 4 is referred to by 12. In place of the fibre cable 4 other means of lighting can also be used such as halogen light sources, etc.

The microscope 100 is also equipped with an additional optic 30, 32 which allows intra-ocular surgery to be performed.

The additional optic has an ophthalmoscopy lens or fundus lens 30 and a correction lens 32. The ophthalmoscopy lens 30 is used for optical compensation of the refractive power of the eye.

Since the ophthalmoscopy lens 30 and the correction lens 32 are used together in intra-ocular surgery, they can advantageously be swivelled out by means of a swivelling mechanism (not shown) from the beam path 12a between object 40 and main objective 2 or the optical axis 11a of the main objective 2. This swivelling ability guarantees that the microscope 100 can also be used for other surgical interventions which do not require such an additional optic.

Regarding the method of operation of the additional optic it is initially stated that the ophthalmoscopy lens 30 generates an initial intermediate image 31 of the object 40 in front of the main objective 2 of the microscope 100. The image 31 generated by the ophthalmoscopy lens 30 is vertically and laterally inverted (pseudo-stereoscopic). The correction lens 32 is advantageously fashioned in a displaceable manner along the optical axis 11a, as indicated by the double arrow. By displacing the correction lens 32 it is, for example, possible to focus on a section of interest of the object or eye 40, without having to make adjustments on the optical systems in the housing 102.

The intermediate image 31, as mentioned, is laterally and vertically inverted or pseudo-stereoscopic. In order to provide a laterally and vertically correct image the individual micromirrors 82 of the optical elements 21a, 21b fashioned as micro-mirror arrays 80 are set in a concave mirror arrangement, as explained above with reference to FIG. 1B. In detail, the observation beam propagation is as follows: the beam paths resulting from the vertically and laterally inverted intermediate image 31 are converted by means of the correction or auxiliary lens 32 or if necessary (following deflection at the deflection element 5) the optical additional components 8 into a beam path that is essentially parallel to the axis along the optical axis 11b of the first microscope plane I. This beam path parallel to the axis is deflected by means of the optical element 21a which works as a concave mirror (micro-mirror array 80 in concave mirror arrangement) into a further intermediate image 22 in the vertical beam path 12c between the two microscope planes I, II. This intermediate image 22 is laterally and vertically correct or stereoscopic. This intermediate image 22 is then by means of the optical element 21b (micro-mirror array 80) working as a concave mirror again depicted in the second microscope plane II ad infinitum (in the beam path essentially parallel to the axis). Along the third optical axis 11d is the magnification system 7 which is preferably fashioned as a four-channel zoom system, by which, as already mentioned, the stereoscopic splitting for the main operator and assistant takes place. At this point reference is again made to the dual function of the optical elements 21a, 21b (micro-mirror arrays 80). On the one hand they serve to deflect the beam paths and thus make optimum use of the room within the microscope body 102, and on the other hand to invert a pseudo-stereoscopic intermediate image so that the number of optical components can be reduced compared with conventional solutions.

The optical elements 21a, 21b (micro-mirror arrays 80) thus serve both to deflect the observation beam paths within the microscope housing and to generate or display an image ad infinitum respectively so that in a simple and economical fashion image erecting of an inverted, pseudo-stereoscopic intermediate image is provided.

According to the invention, it is also possible to replace conventionally used SDI systems, which have relatively complex prism and plane mirror systems, by micro-mirror arrays. It would also be conceivable, in place of the optical element 21a or 21b, to fashion the deflection element 5 with a refractive power or as a micro-mirror array. In this way, the inverted intermediate image would be generated in the first microscope plane I.

If the microscope 100 is used without the ophthalmoscopy attachment 30, 32, this can be removed from the beam path 12a, in particular by swinging out. A corresponding adjustable mechanism, which can have a manual or motorised design, is not shown in detail. In this case, as illustrated in FIG. 3A, the optical elements 21a, 21b fashioned as micromirror arrays 80, are modified in such a way that the arrangement of the individual micro-mirrors parallel with each other and planar, as shown in FIG. 1A, results. Thus, the optical elements 21a, 21b (micro-mirror arrays 80) work as plane mirrors as clearly shown in FIG. 3A. Otherwise, the configuration of the microscope according to FIG. 3A corresponds essentially to that of FIG. 2 so that a further detailed explanation can be dispensed with.

It should be noted that when setting the micro-mirror arrays 80 for provision of a plane mirror function further decoupling possibilities for beam paths can be created, as referred to in FIGS. 3A and 3B by 50a, 50b, 50c. To these ends, the micro-mirrors 82 can be designed to be semi-permeable. It is also conceivable by fashioning intermediate areas between the individual micro-mirrors 82 to create a geometrical beam splitter.

Figure 4A:
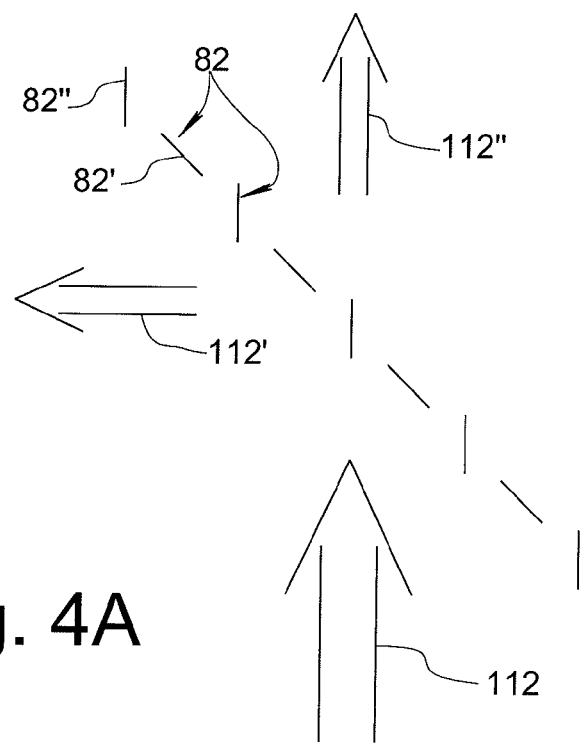
FIG. 4A is an enlarged schematic representation showing a configuration of a micro-mirror array which can be used according to the invention for creating a beam splitter device by arranging a first plurality of micro-mirrors to reflect part of an incoming beam and arranging a second plurality of micro-mirrors such that another part of the incoming beam is transmitted through the micro-mirror array.
Figure 4B:
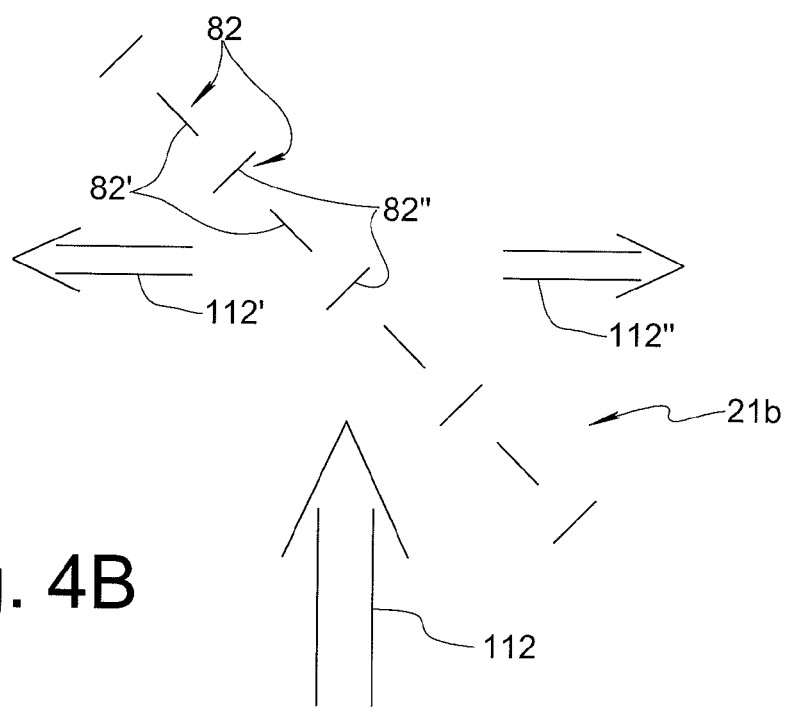
FIG. 4B is an enlarged schematic representation showing a configuration of a micro-mirror array which can be used according to the invention for creating a beam splitter device by arranging a first plurality of micro-mirrors to reflect part of an incoming beam and arranging a second plurality of micro-mirrors to reflect another part of the incoming beam in a different direction.
Figure 5:
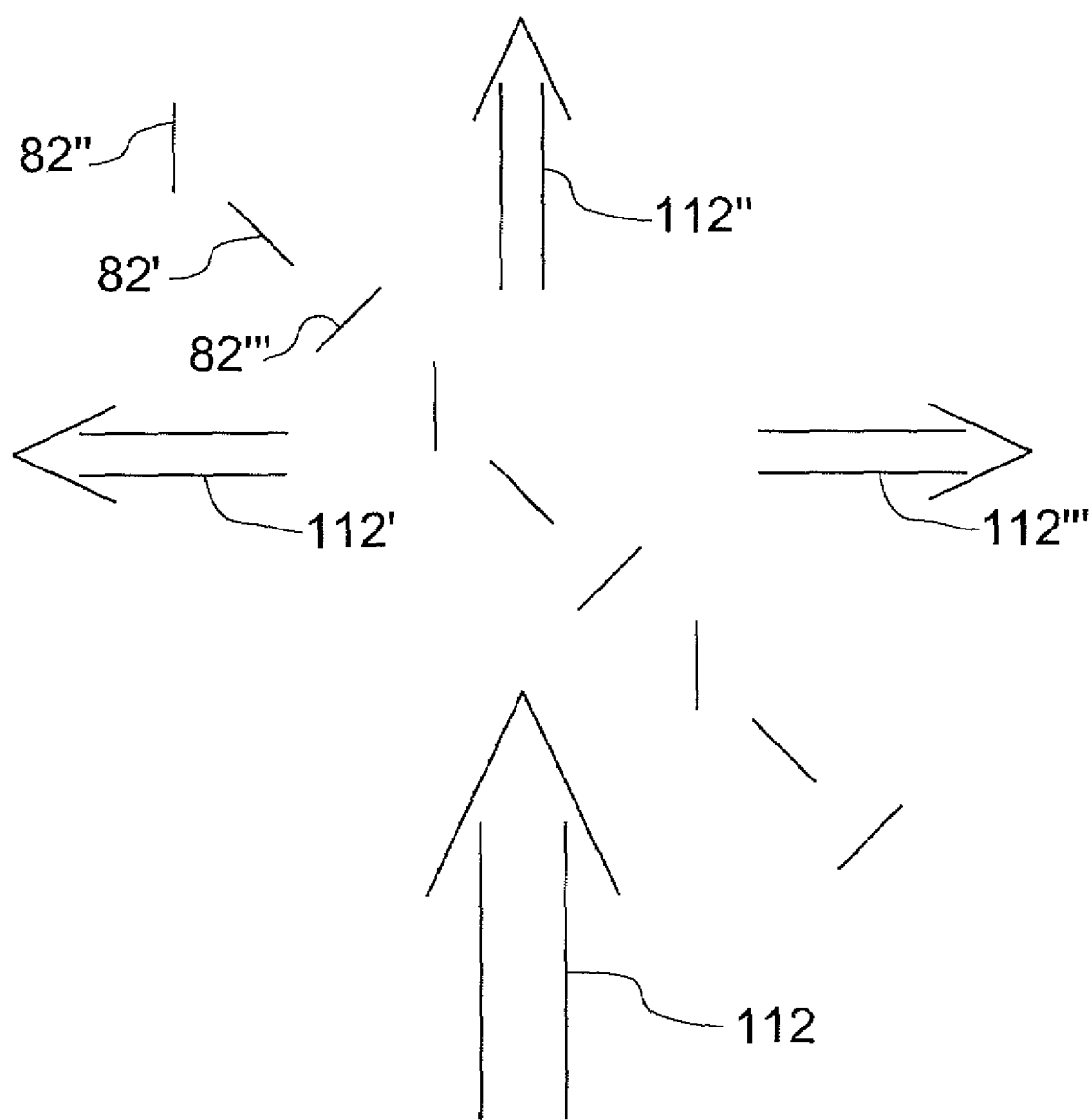
FIG. 5 is an enlarged schematic representation showing a further configuration of a micro-mirror array which can be used according to the invention for creating a beam splitter device wherein a first plurality of micro-mirrors, a second plurality of micro-mirrors, and a third plurality of micro-mirrors are arranged to combine the configuration principles of FIGS. 4A and 4B.
Figure 6A:
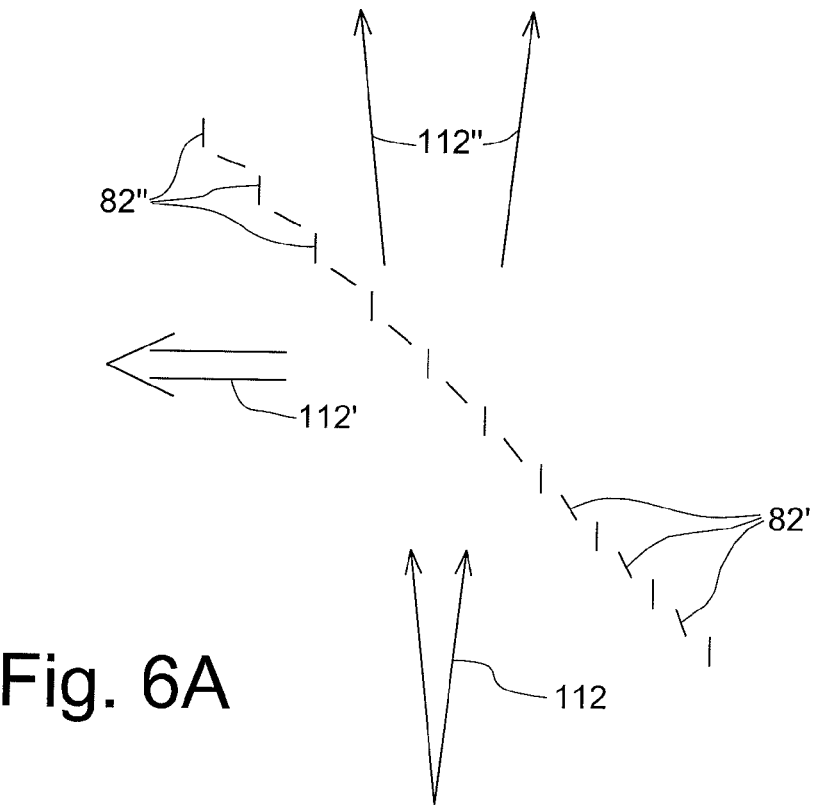
FIG. 6A is an enlarged schematic representation of a micro-mirror array showing a configuration similar to that shown in FIG. 4A, except the first plurality of micro-mirrors are arranged to provide focal power with respect to a reflected beam path.
Figure 6B:
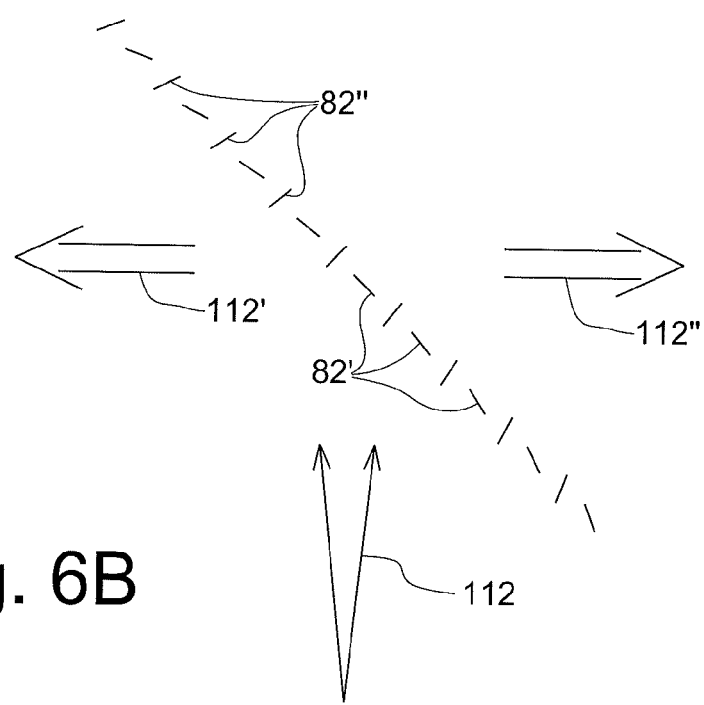
FIG. 6B is an enlarged schematic representation of a micro-mirror array showing a configuration similar to that shown in FIG. 4A, except the first plurality of micro-mirrors and second plurality of micro-mirrors are each arranged to provide focal power with respect to a their respective reflected beam paths.
Figure 7:
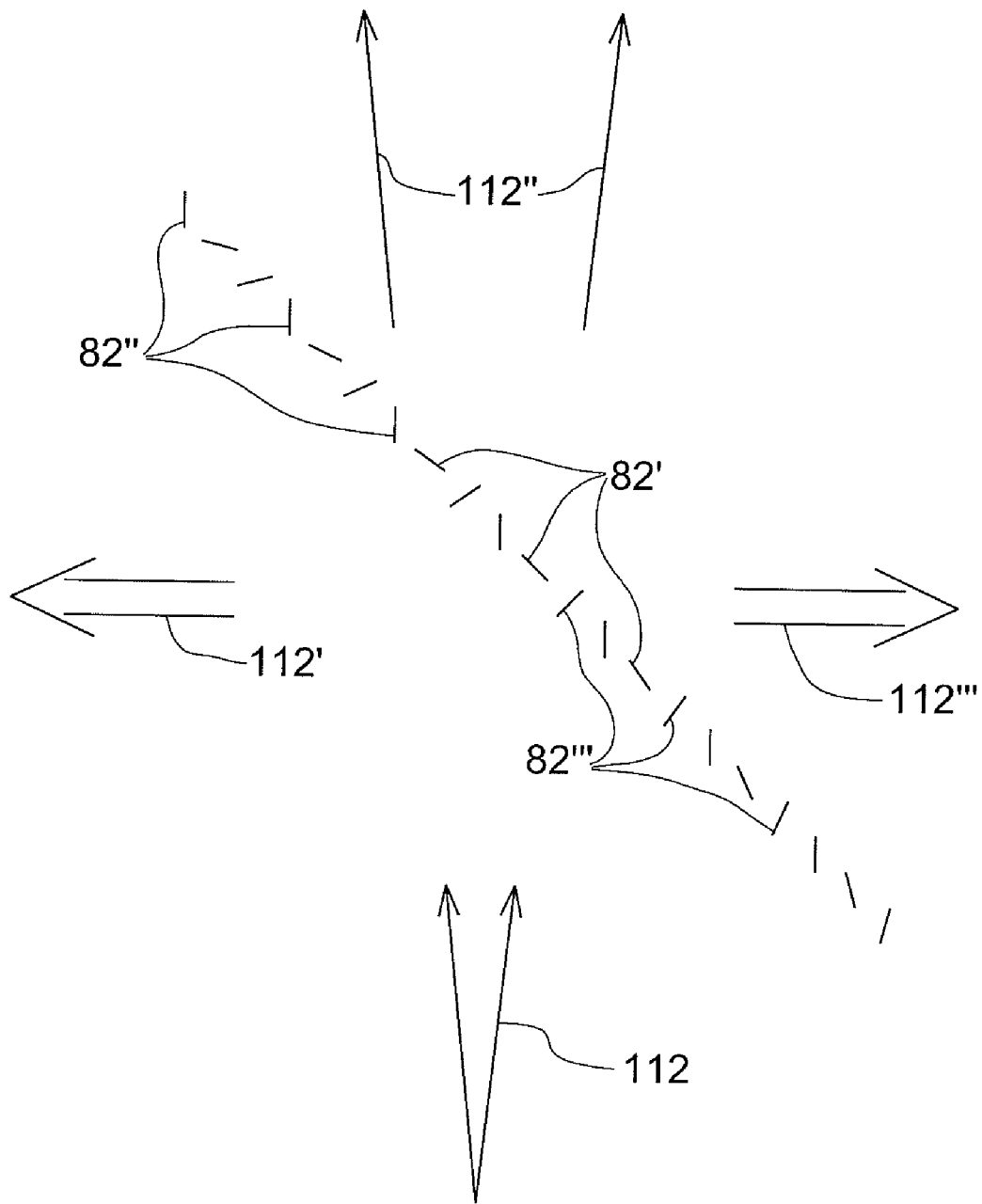
FIG. 7 is an enlarged schematic representation of a micro-mirror array showing a configuration similar to that shown in FIG. 5, except the first plurality of micro-mirrors and third plurality of micro-mirrors are each arranged to provide focal power with respect to a their respective reflected beam paths.

Examples of arrangements of the micro-mirrors 82 of the micro-mirror arrays 80 for creating decouplings at 50a, 50b and 50c in FIGS. 3A are shown in FIGS. 4A, 4B and 5. Similar examples for creating decouplings at 50a, 50b in FIG. 3B are shown in FIGS. 6A, 6B and 7.

FIG. 4A shows an arrangement of the micro-mirrors 82 as, by way of example, they perform the role of optical element 21a with simultaneous decoupling of the beam path 50c. The arrangement of the micro-mirrors 82 can be used analogously in the case of the optical element 21b which serves as the deflection element, if this is merely to provide the decoupled beam path 50a.

It can be seen in FIG. 4A that a first plurality of the micro-mirrors, referred to here by 82', describe an angle of 45° in relation to the beam path arising. A second plurality of the micro-mirrors, referred to here by 82", are essentially aligned parallel to a beam path arising 112. This arrangement of the micro-mirrors 82 leads overall to part of the light falling upon it being deflected by 90° into a beam path 112', while part of the light arising passes as a beam path 112" through the micro-mirror array without deflection.

FIG. 4B illustrates a configuration wherein the second plurality of micro-mirrors 82" are arranged at an angle of 90° to the first plurality of micro-mirrors 82'. Overall, these micro-mirrors 82" deflect the light beam 112 in the opposite direction to the mirrors 82', such that resultant beam path 112" proceeds in an opposite direction from resultant beam path 112'. This configuration may be used in element 21b, for example, to provide decoupling at 50b but not at 50a.

For simultaneous execution of a beam deflection and the two decouplings 50a, 50b, as shown in FIG. 3A, a micro-mirror arrangement can, for example, be used as shown schematically in FIG. 5. A first plurality of micro-mirrors 82' and a second plurality of micro-mirrors 82" are arranged as in FIG. 4A. As in FIG. 4A, they bring about a deflection or transmission of a beam path 112 into beam paths 112', 112", respectively.

In the configuration of FIG. 5, a third plurality of the micro-mirrors 82''' are arranged at an angle of 90° to the first plurality of micro-mirrors 82' in a manner similar to the arrangement of micro-mirrors 82" in FIG. 4B. Overall, these micro-mirrors 82''' deflect the light beam 112 in the opposite direction to the mirrors 82'. The resultant beam path is referred to by 112''' in FIG. 5. For the arrangement of an optical element 21b in the diagonal shown in FIG. 3A this also results in decoupling possibilities which were not possible with the conventional prisms or mirrors. A deflection element 21b fashioned as a conventional mirror in the arrangement of FIG. 3A is not capable of bringing about a decoupling of a partial beam path 50b. By the deflection of a beam path that is possible according to the invention into any number of partial beam paths (more than three partial beam paths are of course also conceivable) particularly small and compact optical arrangements within a microscope body can be created.

It should be mentioned that the micro-mirrors 82, 82', 82" and 82''' should advantageously be designed in terms of size and position in such a way that they are not shaded or vignetted by an adjacent micro-mirror or adjacent micro-mirrors or beam paths transmitted or deflected by adjacent micro-mirrors.

For the sake of completeness it should be stated that by means of the arrangements of micro-mirrors as shown in particular in FIGS. 4A, 4B and 5, corresponding beam couplings or data couplings from different directions are possible.

Advantageously, the optical elements 21a or 21b or the micro-mirror arrays 80 are coupled with the ophthalmoscopy attachment so that when the ophthalmoscopy attachment is removed from the beam path 12a an automatic or motorised adjustment of the micro-mirrors 82 can be brought about in order to provide a plane mirror function.

In the embodiment of FIG. 3B, the micro-mirror array 80 positioned as element 21b may be controlled to provide a configuration that includes a first plurality of micro-mirrors 82' adjusted to deflect the main beam path such that the main beam path proceeds along third optical axis 11d substantially parallel to the second optical axis, the first plurality of micro-mirrors 82' being adjusted to a concave or spherical configuration providing focal power in order to image the vertically and laterally correct (stereoscopic) intermediate object image 22 at infinity along the main beam path when the ophthalmoscopy lens 30 is inserted in the main beam path. FIGS. 6A, 6B, and 7 show different micro-mirror configurations of element 21b which are similar to one another from the standpoint that the first plurality of micro-mirrors 82' deflecting beam path 112' are in each case adjusted to a spherical or concave focal power configuration. The first plurality of micro-mirrors 82' may be adjusted to a planar non-focal power configuration that deflects the main beam path without introducing focal power when the ophthalmoscopy lens 30 is removed from the main beam path, as may be understood from FIGS. 4A, 4B, and 5.

With further reference to FIG. 3B, the micro-mirror array 80 positioned as element 21b may be controlled to provide a second plurality of micro-mirrors 82" adjusted to split (decouple) an assistant beam path 50a and/or 50b out of the main beam path.

In a configuration shown in FIG. 6A, the beam-splitting function is accomplished by essentially aligning the second plurality of micro-mirrors 82" parallel to the incident beam path 112 such that part of the incident beam 112 is transmitted as a beam path 112" (corresponding to the axis 12c' of the observation beam in FIG. 3B) through the micro-mirror array without deflection in a manner analogous to the configuration of FIG. 4A. As shown in FIG. 3B, the microscope 100 may further comprise a third micro-mirror array 51 adjusted to a focal power configuration, such as a spherical or concave configuration of its micro-mirrors, that images the vertically and laterally correct object image 22 at infinity along the assistant beam path 50a when the ophthalmoscopy lens 30 is inserted in the main beam path. The focal length of third micro-mirror array 51 must be larger than the focal length of the first plurality of micro-mirrors 82' of element 21b because of the larger distance of intermediate image 22 to third micro-mirror array 51 as compared to element 21b. The third micro-mirror array 51 may of course be adjusted to a planar non-focal power configuration that deflects the assistant beam path without introducing focal power when the ophthalmoscopy lens 30 is removed from the main beam path.

In a configuration shown in FIG. 6B, the beam-splitting function is accomplished by arranging the second plurality of micro-mirrors 82" of element 21b at an angle of 90° to the first plurality of micro-mirrors 82'. The second plurality of micro-mirrors 82" deflect the incident light beam 112 in the opposite direction to the mirrors 82', such that resultant beam path 112" proceeds in an opposite direction from resultant beam path 112'. This configuration may be used in element 21b to provide decoupling at 50b but not at 50a. As may be understood from FIG. 6B, the second plurality of micro-mirrors 82" are adjusted to a focal power configuration that images the vertically and laterally correct object image 22 at infinity when the ophthalmoscopy lens 30 is inserted in the main beam path. The second plurality of micro-mirrors 82" may be adjusted to a non-focal power configuration that deflects the assistant beam path 50b without introducing focal power when the ophthalmoscopy lens 30 is removed from the main beam path.

The configuration shown in FIG. 7 represents a combination of the arrangements in FIGS. 6A and 6B, and may be used at element 21b to simultaneously decouple assistant beam paths from the main beam path at both 50a and 50b. In the configuration of FIG. 7, the micro-mirror array 80 is controlled to include a first plurality of micro-mirrors 82' and a second plurality of micro-mirrors 82" arranged as in FIG. 6A, and a third plurality of micro-mirrors 82''' adjusted in a manner analogous the second plurality 82" in FIG. 6B to split assistant beam path 50b out of the main beam path in addition to assistant beam path 50a decoupled from the main beam path by transmission through array 80 (the additional assistant beam path 50b corresponds to beam path 112" in FIG. 7). Like the first and second pluralities of micro-mirrors, the third plurality of micro-mirrors 82''' are adjusted to a focal power configuration that images the vertically and laterally correct object image 22 at infinity along the additional assistant beam path when the ophthalmoscopy lens 30 is inserted in the main beam path. The first, second, and third pluralities of micro-mirrors may each be adjusted to a non-focal power configuration, for example as depicted in FIG. 5, when the ophthalmoscopy lens 30 is removed from the main beam path.

It should be pointed out that it is also possible, for example, to fashion the deflection elements 6 or 51 as micro-mirror arrays, and here also to perform the inward and/or outward reflection. It can also be advantageous here to use an optical beam splitter, for example for a documentation device.

With the micro-mirror arrays 80 described according to the invention, with which in a simple fashion both concave (focal power) mirror and plane mirror functions, as well as beam splitting functions, can be performed, further new possibilities for operating a stereo microscope arise: if, for example, the microscope is operated with the micro-mirror arrays functioning as plane mirrors, i.e. therefore by way of example not in retinal surgery, by controlling one or both micro-mirror arrays detuning of the parallel beam path can be generated so that a spherical surface is applied to one micro-mirror array or to both micro-mirror arrays. With such a detuning, which can also take place continuously, it is for, example, possible, without displacing a lens, to guarantee focusing of the microscope optic (adapted optic).

Furthermore, by corresponding setting of the individual micro-mirrors on the micro-mirror array optional areas, so-called free-form areas, can be constructed with which defects occurring or created in the beam path can be compensated. In classical optic elements such defects could only be corrected with high optical effort in the design.

LEGEND

2 Main objective
3 Lighting device
3a Deflection element of the lighting device
4 Fibre cable
5, 6 Deflection elements
7 Magnification system (zoom system)
8 Optical additional components
9 Deflection element (decoupling device)
10 Deflection element
11a, 11b, 11d Optical axes of the optical elements
12 Optical axis of the fibre cable
12a-12h; 12c' Axes of the observation beams
13 Axis of rotation of the deflection element 10
16 Deflection element
21a, 21b Optical elements (deflection elements)
22 Intermediate image
30 Ophthalmoscopy lens (fundus lens)
31 Intermediate image
32 Correction lens
40 Object
50a, 50b, 50c Decoupled beam paths
51 Deflection element
80 Micro-mirror array
82 Micro-mirror
82', 82", 82''' Micro-mirrors 82 in special orientation
84 Supply
100 Stereo microscope
102 Microscope body (housing)
112, 112', 112", 112''' Beam paths
I, II, III Microscope planes

What is claimed is:

1. A microscope for observing an object, the microscope comprising:
 a main beam path proceeding from the object;
 a main objective (2) in the main beam path, the main objective defining a first optical axis (11a) along which the main beam path proceeds;
 an ophthalmoscopy lens (30) selectively insertable into the main beam path between the object and the main objective and removable from the main beam path, the ophthalmoscopy lens forming a pseudo-stereoscopic intermediate image (31) of the object when the ophthalmoscopy lens is inserted in the main beam path;
 a first deflection element (5) after the main objective, wherein the first deflection element changes the direction of the main beam path such that the main beam path proceeds along a second optical axis (11b) substantially perpendicular to the first optical axis;
 a magnification adjustment system (7) in the main beam path after the first deflection element, the magnification adjustment system being aligned along the second optical axis;
 a first micro-mirror array (21a) in the main beam path after the magnification adjustment system, wherein the first micro-mirror array changes the direction of the main beam path out of the second optical axis, the first micro-mirror array being adjusted to a focal power configuration that erects the pseudo-stereoscopic object image to form a vertically and laterally correct intermediate image (22) of the object when the ophthalmoscopy lens is inserted in the main beam path and being adjusted to a non-focal power configuration that deflects the main beam path without introducing focal power when the ophthalmoscopy lens is removed from the main beam path; and
 a second micro-mirror array (21b) after the first micro-mirror array, wherein the second micro-mirror array includes (i) a first plurality of micro-mirrors (82') adjusted to deflect the main beam path such that the main beam path proceeds along a third optical axis (11d) substantially parallel to the second optical axis, the first plurality of micro-mirrors being adjusted to a focal power configuration that images the vertically and laterally correct object image at infinity along the main beam path when the ophthalmoscopy lens is inserted in the main beam path and being adjusted to a non-focal power configuration that deflects the main beam path without introducing focal power when the ophthalmoscopy lens is removed from the main beam path, and (ii) a second plurality of micro-mirrors (82") adjusted to split an assistant beam path (50a or 50b) out of the main beam path.

2. The microscope according to claim 1, wherein the second plurality of micro-mirrors (82") are adjusted such that the assistant beam path (50a) is transmitted through the second micro-mirror array, and the microscope further comprises a third micro-mirror array (51) adjusted to a focal power configuration that images the vertically and laterally correct object image at infinity along the assistant beam path when the ophthalmoscopy lens is inserted in the main beam path and adjusted to a non-focal power configuration that deflects the assistant beam path without introducing focal power when the ophthalmoscopy lens is removed from the main beam path.

3. The microscope according to claim 2, wherein the second micro-mirror array (21b) further includes (iii) a third plurality of micro-mirrors (82''') adjusted to split an additional assistant (50b) beam path out of the main beam path, the third plurality of micro-mirrors being adjusted to a focal power configuration that images the vertically and laterally correct object image at infinity along the additional assistant beam path when the ophthalmoscopy lens is inserted in the main beam path and being adjusted to a non-focal power configuration that deflects the additional assistant beam path without introducing focal power when the ophthalmoscopy lens is removed from the main beam path.

4. The microscope according to claim 3, wherein the third plurality of micro-mirrors (82''') deflect the additional assistant beam path (50b) such that the additional assistant beam path proceeds along the third optical axis in a direction opposite from the direction of the main beam path, the third plurality of micro-mirrors being adjusted to a focal power configuration that images the vertically and laterally correct object image at infinity when the ophthalmoscopy lens is inserted in the main beam path and being adjusted to a non-focal power configuration that deflects the additional assistant beam path without introducing focal power when the ophthalmoscopy lens is removed from the main beam path.

5. The microscope according to claim 1, wherein the second plurality of micro-mirrors (82") deflect the assistant beam path (50b) such that the assistant beam path proceeds along the third optical axis in a direction opposite from the direction of the main beam path, the second plurality of micro-mirrors being adjusted to a focal power configuration that images the vertically and laterally correct object image at infinity when the ophthalmoscopy lens is inserted in the main beam path and being adjusted to a non-focal power configuration that deflects the assistant beam path without introducing focal power when the ophthalmoscopy lens is removed from the main beam path.

6. The microscope according to claim 1, wherein the microscope is a stereo microscope.

7. The microscope according to claim 6, wherein the magnification adjustment system (7) includes a zoom system having at least two stereoscopic observation channels.

* * * * *